United States Patent
Desombre (10) Patent No.: US 12,495,962 B2
(45) Date of Patent: Dec. 16, 2025

(54) GASTRIC CALIBRATION HOSE

(71) Applicant: Q MEDICAL INTERNATIONAL AG, Stein am Rhein (CH)

(72) Inventor: Rainer Desombre, Meerbusch (DE)

(73) Assignee: Q MEDICAL INTERNATIONAL AG, Stein am Rhein (CH)

( * ) Notice: Subject to any disclaimer, the term of this patent is extended or adjusted under 35 U.S.C. 154(b) by 1073 days.

(21) Appl. No.: 17/421,236

(22) PCT Filed: Jan. 7, 2020

(86) PCT No.: PCT/EP2020/050214
§ 371 (c)(1),
(2) Date: Jul. 7, 2021

(87) PCT Pub. No.: WO2020/151936
PCT Pub. Date: Jul. 30, 2020

(65) Prior Publication Data
US 2022/0117475 A1 Apr. 21, 2022

(30) Foreign Application Priority Data
Jan. 22, 2019 (EP) .................................. 19152967

(51) Int. Cl.
*A61B 1/273* (2006.01)
*A61B 90/30* (2016.01)

(52) U.S. Cl.
CPC ...... *A61B 1/2736* (2013.01); *A61B 2090/309* (2016.02)

(58) Field of Classification Search
None
See application file for complete search history.

(56) References Cited

U.S. PATENT DOCUMENTS

| 2,498,692 | A | 2/1950 | Marshall |
| 3,780,740 | A | 12/1973 | Rhea |
| 6,379,296 | B1 * | 4/2002 | Baggett .................. A61B 1/303 |
| | | | 600/179 |
| 2012/0059266 | A1 * | 3/2012 | Davis ..................... A61B 5/445 |
| | | | 600/476 |

(Continued)

FOREIGN PATENT DOCUMENTS

| CN | 101115526 A | 1/2008 | |
| CN | 105877849 A * | 8/2016 | .............. A61M 1/84 |

(Continued)

OTHER PUBLICATIONS

Office Action issued on May 26, 2024, in corresponding Saudi Arabian Application No. 521422570, 11 pages.

(Continued)

*Primary Examiner* — Tessa M Matthews
(74) *Attorney, Agent, or Firm* — Maier & Maier, PLLC (57) ABSTRACT

In a gastric calibration hose with an elongated flexible hollow body having an outer wall and a first and a second hose end, it is provided that the elongated flexible hollow body has at least two channels, each of which extend in the longitudinal direction of the hollow body, the first channel having at least one opening in the area of the second hose end, and the second channel being closed at the second hose end, at least one illuminant being arranged in the second channel in the area of the second hose end.

14 Claims, 5 Drawing Sheets

(56) References Cited

U.S. PATENT DOCUMENTS

| | | | |
|---|---|---|---|
| 2017/0304099 A1* | 10/2017 | Keren | .................. A61B 17/072 |
| 2018/0008172 A1* | 1/2018 | Mycek | ............. G01N 33/54366 |
| 2018/0049950 A1* | 2/2018 | Besser | .................. A61M 5/142 |
| 2018/0085102 A1 | 3/2018 | Kikuchi | |

FOREIGN PATENT DOCUMENTS

| | | |
|---|---|---|
| CN | 107613843 A | 1/2018 |
| DE | 135469 C | 11/1902 |
| EP | 1629764 A1 | 3/2006 |
| WO | 2017011085 A1 | 1/2017 |

OTHER PUBLICATIONS

Office Action issued on Jul. 13, 2023, in corresponding Chinese Application No. 202080009564.5, 10 pages.
International Search Report issued on Feb. 3, 2020 in corresponding International application No. PCT/EP2020/050214; 7 pages.
Office Action issued on Mar. 5, 2024, in corresponding Brazilian Application No. BR112021012794-1, 8 pages.
Office Action issued on Feb. 15, 2024, in corresponding Canadian Application No. 3,125,361, 5 pages.

* cited by examiner

GASTRIC CALIBRATION HOSE

FIELD

The invention relates to a gastric calibration hose.

BACKGROUND

From prior art gastric calibration hoses are known which can be used in surgical procedures, in particular in interventions concerning the stomach and in bariatric interventions such as gastric resections, Laparoscopic Banded Sleeve Gastrectomy (LBSG), conventional Sleeve Gastrectomy (LCSG), fundoplication, gastric band insertions and e.g. gastric bypasses. The gastric calibration hose serves for visible and palpable demarcation of parts of the stomach as well as for decompression, emptying and removal of gastric acid.

The gastric calibration hose comprises an elongated flexible hollow body having an outer wall and a first and a second hose end. The second hose end can be inserted via the mouth and the esophagus into the stomach. The first hose end remains outside the body. The first hose end can be coupled to medical devices such as syringes, cannulas or means for introducing air or liquid into the calibration hose and for generating negative pressure in the calibrating hose.

There is an increasing need for the attending physician or the physician performing the surgery to be supported, in particular with regard to the visible and palpable demarcation of parts of the stomach.

SUMMARY

Thus, it is an object of the present invention to provide a gastric calibration hose which supports the attending physician or the physician performing the surgery in visible and palpable demarcation of parts of the stomach.

The invention advantageously provides that the elongated flexible hollow body comprises at least two channels extending in longitudinal direction of the hollow body, the first channel comprising at least one opening in the area of the second hose end and the second channel being closed at the second hose end, at least one illuminant being arranged in the area of the second hose end in the second channel.

The present invention has the advantage of having an illuminant arranged in the gastric calibration hose in the area of the second hose end, thereby making the position of the calibration hose much more visible during surgery and assisting the attending physician or the physician performing the surgery in demarcating parts of the stomach.

Furthermore, by dividing the hollow body into at least two channels, the illuminant is very well protected within the second channel and does not obstruct the suction in the first channel.

The flexible hollow body is elongated and has a longitudinal axis. The hollow body is thus longer in a direction parallel to the longitudinal axis than it is wide in a direction transverse to the longitudinal axis.

In the present invention, the term "in the area of" is used for the second hose end, the term being understood to mean that this area comprises at least the half of the calibration hose that also comprises the second hose end. Preferably, "in the area of" is to be understood as comprising only ⅓, in particular ¼, more preferably ⅕ of the calibration hose which includes the respective hose end.

When using the term in the area of the first end of the hose, the same applies.

A power supply device may be provided for the at least one illuminant, the power supply device being connected to the illuminant by means of at least one power cable, the power supply device being arranged outside the hollow body.

As the power supply device is arranged outside the hollow body, the geometry of the power supply device can be designed to be completely flexible.

The power supply device can be connected from outside on the outer wall of the hollow body to the hollow body.

In this way, the power supply device has a fixed place and does not interfere with the surgery.

The power supply device can be releasably attached to the hollow body, preferably attached to the hollow body by means of a clip connection.

The second channel can be at least partially delimited by the outer wall of the hollow body, wherein the outer wall delimiting the second channel has an exit opening in the area of the first hose end, through which exit opening the at least one power cable is guided, which connects the power supply device and the illuminant.

The first hose end is not inserted into the patient during a surgery and therefore the power supply device located outside the hollow body can be located in this area. As the power cable is led out of the second channel in this area, it does not interfere with the surgery.

The at least one illuminant can be a first LED band that comprises an upper side and a lower side, several adjacently arranged LEDs being arranged on the upper side.

In such an LED bank with several LEDs a very high luminous intensity is secured. The luminous flux is 4000 to 5000 lumen.

Different LEDs can also be arranged on the LED band so that different light colors can be set.

A second illuminant may be provided which is a second LED band having an upper side and a lower side, several adjacently arranged LEDs being arranged on the upper side, and the lower side of the second LED band being connected to the lower side of the first LED band such that the LEDs arranged on the respective upper sides illuminate in opposite directions.

This has the advantage that two sides are very well illuminated and thus the space around the calibration hose is very well illuminated.

Alternatively, several adjacently arranged LEDs may also be provided on the lower side of the first LED band. In such a configuration, light would also be emitted in two directions.

Preferably, the first and/or the second LED band can be between 2 and 30 cm long.

A terminating element may be provided at the second hose end to terminate the hollow body.

The terminating element can be formed to be blunt. In this way, the gastric calibration hose can be easily inserted into the stomach via the esophagus without damaging tissue.

The terminating element can comprise a material that includes radiopaque material, preferably barium sulfate.

In this way, the terminating element can be localized with X-ray machines, for example. This can ensure that the calibration hoses do not get lost in the body during a surgery.

The power supply device can be switched on and off. The power supply device can thus comprise a switch.

The power supply device can comprise at least one battery and/or rechargeable battery. The batteries can be customary AA batteries.

As the power supply device is arranged outside the hollow body and the power supply device can comprise any geometry, customary batteries can also be used. The outer wall of the hollow body and/or the delimiting wall between the at least two channels can be made of a material including silicone.

In the present invention, the term "flexible hollow body" is used. In this context, "flexible" means that the hollow body can be bent. Preferably, the hollow body should be able to be bent by at least 90°.

BRIEF DESCRIPTION OF THE FIGURES

In the following, exemplary embodiments of the present invention are explained in more detailed with reference to the drawings in which.

DETAILED DESCRIPTION

Figure 1:
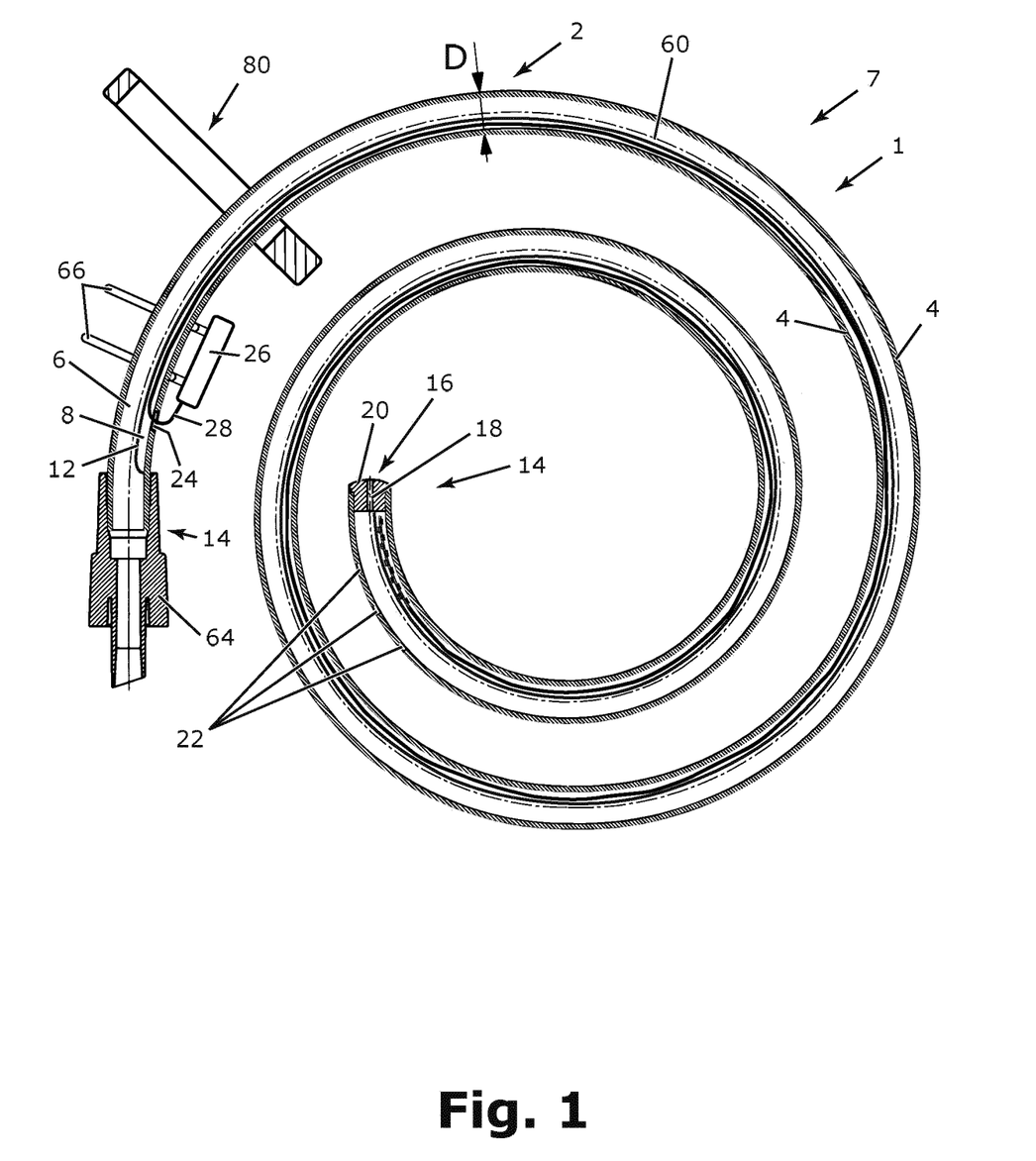
FIG. 1 shows a gastric calibration hose according to the present invention.

FIG. 1 shows a gastric calibration hose 1. The gastric calibration hose 1 comprises an elongated flexible hollow body 2. The elongated flexible body 2 comprises a longitudinal axis 60. The hollow body 2 further comprises an outer wall 4. The hollow body 2 has a first hose end 7 and a second hose end 14. During surgery, the second hose end 14 can be inserted via the mouth and the esophagus into the stomach. The first hose end 7 remains outside the body.

The gastric calibration hose 1 can be used in surgical procedures, in particular in interventions concerning the stomach and in bariatric interventions such as gastric resections, Laparoscopic Banded Sleeve Gastrectomy (LBSG), conventional Sleeve Gastrectomy (LCSG), fundoplication, gastric band insertions and e.g. gastric bypasses. The gastric calibration hose 1 serves for visible and palpable demarcation of parts of the stomach as well as for decompression, emptying and removal of gastric acid.

The calibration hose 1 comprises a terminating element 16 at the second hose end 14. The terminating element 16 is formed to be blunt such that no injuries can occur when introducing the second hose end 14 into the human body. The hollow body 2 comprises at least two channels 6 and 8. The channels 6 and 8 extend in longitudinal direction of the hollow body 2.

The first channel 6 comprises at least one opening 22 in the area of the second hose end 14. In the present case, several openings 22 are provided. Furthermore, the terminating element 16 also comprises an opening 18 opening out into the first channel 6.

The second channel 8 is formed in a closed manner at the second hose end 14. The terminating element 16 terminates the second channel 8 at the second hose end 14. In the area of the second channel 8, no opening is provided in the terminating element 16. In the area of the second hose end 14, the second channel 8 comprises at least one illuminant 30.

Figure 2:
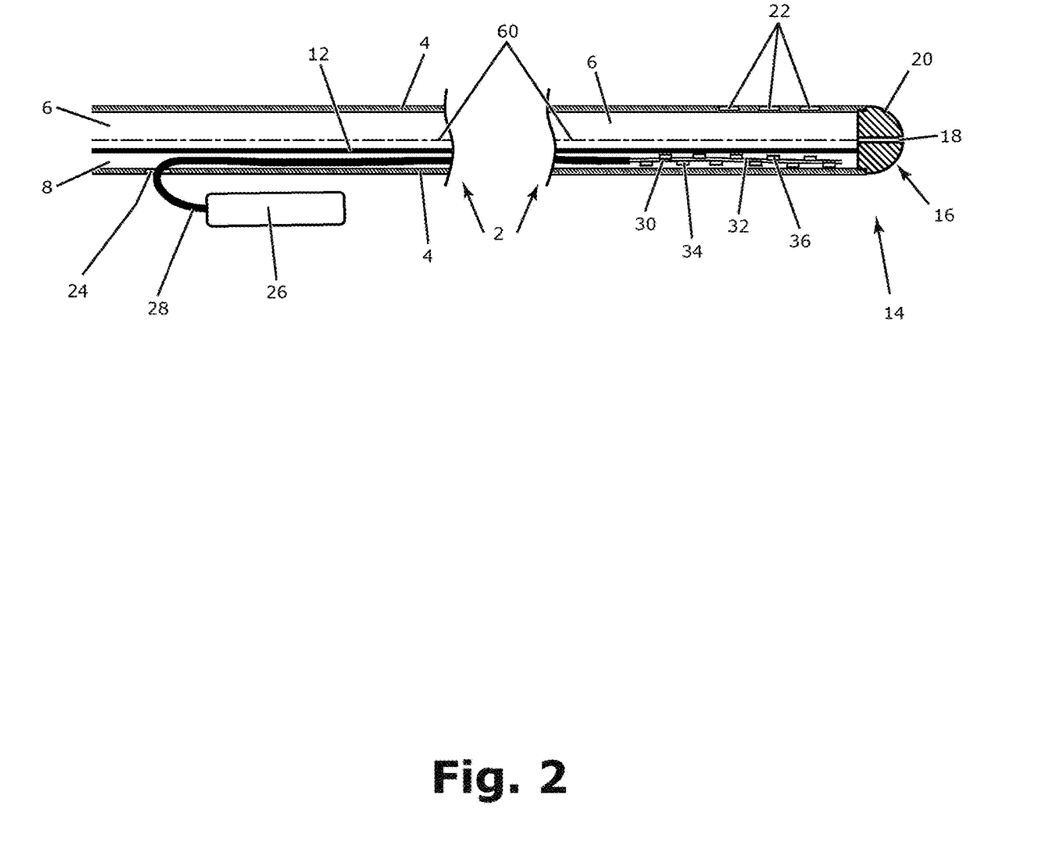
FIG. 2 shows a slightly clearer illustration of the calibration hose of FIG. 1.

In the present exemplary embodiment, a first and a second illuminant are provided which are explained in more detail in the description of FIG. 2. Alternatively, only one illuminant can also be provided.

The illuminants 30, 32 are connected to the power supply device 26 by means of a power cable 28. The power supply device 26 is arranged outside the hollow body 2. The power supply device 26 is connected outside on the outer wall 4 of the hollow body 2 to the hollow body 2. The power supply device 26 can be releasably connected to the hollow body 2 by means of a clip connection which is illustrated in more detail in FIG. 5.

The power cable 28 passes through the second channel 8 and exits the second channel 8, and thus the hollow body 2, at the first hose end 7 through an exit opening 24 and is guided to the power supply device 26.

The power supply device 26 can comprise a battery or a rechargeable battery to provide the at least one illuminant 20, 32 with power, A switch can be provided at the power supply device 26, the switch being used to switch the illuminant on and off.

At the first hose end 7, the second channel can be configured to be closed or open. In the present case, the second channel 8 is closed at the first hose end 7.

At the first hose end 7, the first channel 6 can be coupled to medical devices such as syringes, cannulas or means for introducing air or liquid into the first channel 6 the calibration hose 1 and for generating negative pressure in the first channel 6 of the calibrating hose 1. If a negative pressure is generated in the first channel 6, a negative pressure also prevails at the openings 22 and 18. In this way, a suction can take place by means of the first channel 6.

In FIG. 1, a connecting device 64 is provided which is connected to the first hose end, the calibration hose 1 being inserted into the connection device 64. By means of the connecting device 64, a simple and safe coupling of different medical devices with different connection geometries can be ensured.

At the end of the connecting device facing away from the calibration tube 1, the connecting device for coupling different medical devices has at least one second tapering depression and at least one tapering recess surrounding the second depression in an annular manner, so that the different medical devices can be selectively inserted into the second tapering depression or into the tapering recess for coupling.

However, the calibration hose according to the invention can also be connected to a medical device without or with another connecting device.

FIG. 2 shows the calibration hose in more detail, wherein the first hose end 7 and the second hose end 14 are shown in more detail and the central area of the hollow body 2 is omitted for clarification. Furthermore, the connecting device 64 and the locking slider are also not shown in FIG. 2.

As can be seen in FIG. 2, the first channel 6 and the second channel 8 are separated from each other by a delimiting wall 12. The delimiting wall 12 can have the same material as the outer wall 4 of the hollow body 2.

The second channel 8 is also at least partially delimited by the outer wall 4 of the hollow body. In said outer wall 4 delimiting the second channel 8, an exit opening 24 is provided at the first hose end 7, through which exit opening 24 the power cable 28 is guided.

In FIG. 2, the power supply device 26 is also recognizable which is arranged outside the hollow body 2 and is connected thereto by a preferably releasable clip connection.

Furthermore, it can be seen in FIG. 2 that a second illuminant 30, 32 is arranged at the second hose end 14. The illuminants 30, 32 can be configured as LED bands, as illustrated.

The first and the second LED band each comprise an upper side on which the respective LEDs 34, 36 are arranged. The LED bands are connected with their lower sides to each other such that the LEDs 34, 36 can illuminate in different directions.

The second channel 8 is formed in a closed manner at the second hose end 14. At the second hose end 14, the first channel 6 comprises openings 22 in the outer wall 4 of the hollow body 2. The first channel 6 further comprises an opening 18 which is provided in the terminating element 16 and opens out into the channel 6.

The terminating element 16 is made of a material 20 that preferably includes barium sulfate and is thus detectable by X-ray methods.

Figure 3:
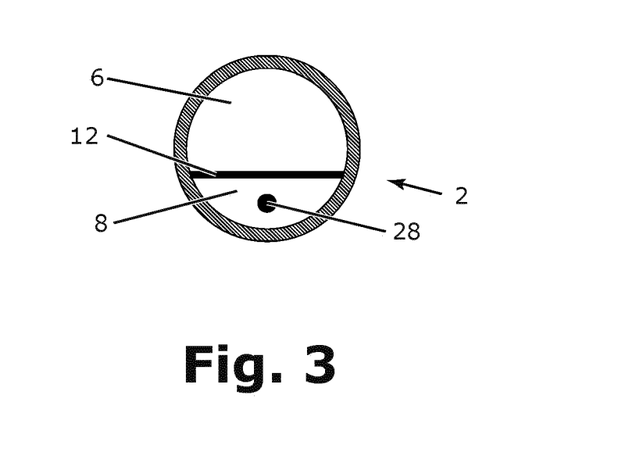
FIG. 3 shows a cross-sectional view of the calibration hose of FIG. 1.

FIG. 3 shows a cross-section through the hollow body 2. In said cross-section, the first channel 6 and the second channel 8 can be recognized as well as the power cable 28 guided through the channel 8.

The outer wall 4 of the hollow body 2 preferably comprises a round cross-section. However, the outer wall 4 could have any other form. However, the round cross-section of the outer wall 4 has the advantage that, when the calibration hose 1 is introduced into the body, the outer wall 4 of the hollow body 2 cannot get caught anywhere and thus cannot cause any injuries in the body.

The outer wall 4 of the hollow body 2 as well as the delimiting wall 12 preferably comprise a material that includes silicone. It is particularly preferred that the outer wall 4 of the hollow body 2 as well as the delimiting wall 12 consist of silicone. The terminating element 16 can also have a material that includes silicone.

The hollow body 4 and the delimiting wall 12 consist of such a material that ensures that the hollow body is flexible and thus can be bent easily. In this way, the hollow body can be introduced easily through the esophagus into the stomach.

Figure 4:
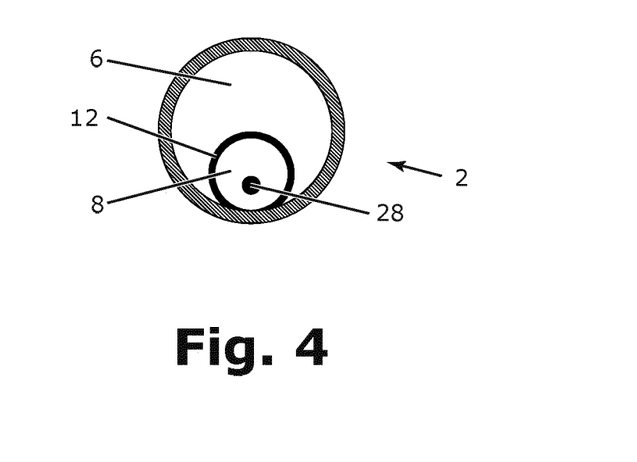
FIG. 4 shows an alternative configuration of a calibration hose in cross-section.

FIG. 4 shows an alternative exemplary embodiment in which the delimiting wall 12 is configured differently than in FIG. 3. Apart from that, the exemplary embodiment is constructed in the same way as the exemplary embodiment according to FIGS. 1-3. The outer wall 4 of the hollow body 2 is configured to be round.

As a further exemplary embodiment, a non-illustrated calibration hose 1 can be provided that is configured similarly to the calibration hose 1 according to FIGS. 1 to 3, but with the addition that a third channel is provided in the hollow body 2. For example, a rope or wire or the like may be provided in the third channel and connected thereto at the second end of the hollow body 2. The rope can then be pulled at the first hose end by means of a rope pulling device and the rope can be shortened. Because the rope is attached to the second end of the hose, the calibration hose 1 can bend.

Figure 5:
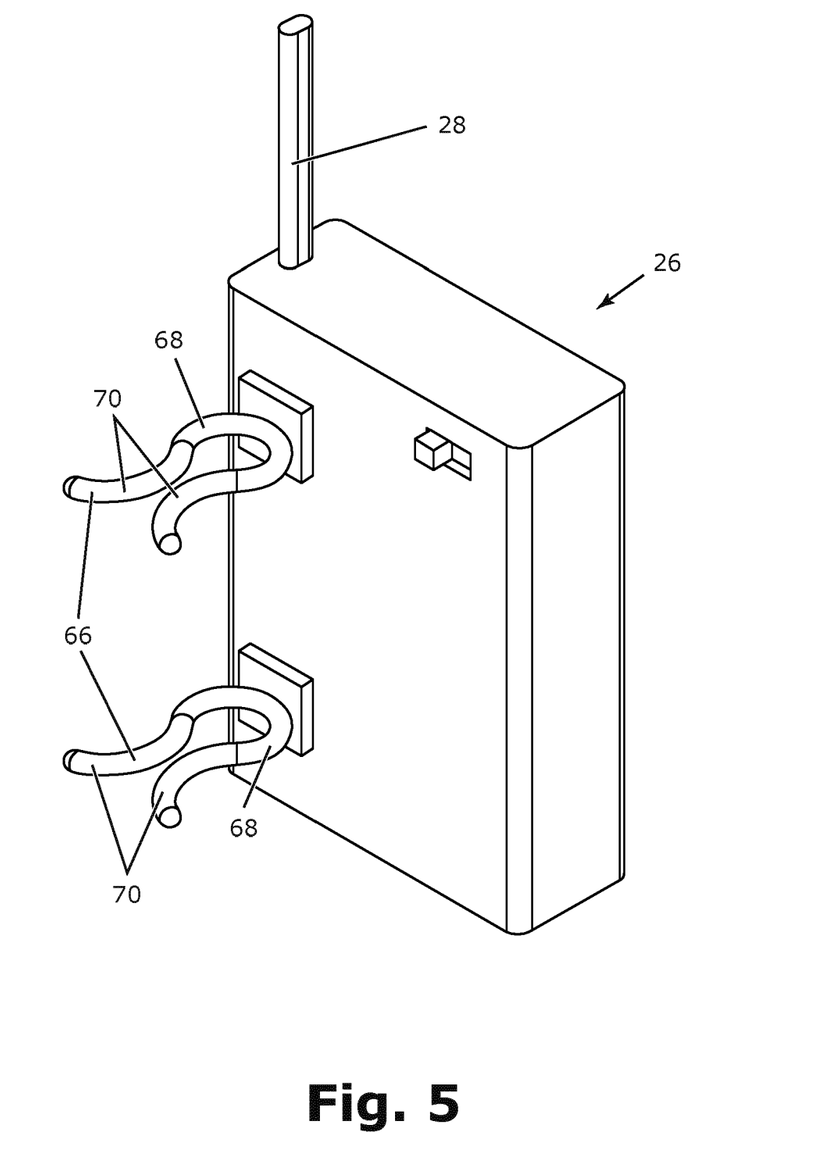
FIG. 5 shows the power supply device with mounting of FIG. 1.

FIG. 5 shows the power supply device 26 according to FIGS. 1 and 2 comprising clip connections 66 with which the power supply device 26 is releasably connected to the hollow body 2. The clip connection 66 has a kind of U shape with a round base element 68 and two protruding clamping legs 70, wherein the clamping legs 70 must be pressed apart by applying a force when plugging onto the calibration hose 1. Due to the tension in the clip connections 66, the clamping legs 70 press together again after being plugged on the calibration hose. The base element 68 has such an inner diameter that it corresponds to the outer diameter of the calibration hose 1. In this way, the calibration hose can be easily and quickly connected to the power supply device 26.

Figure 6:
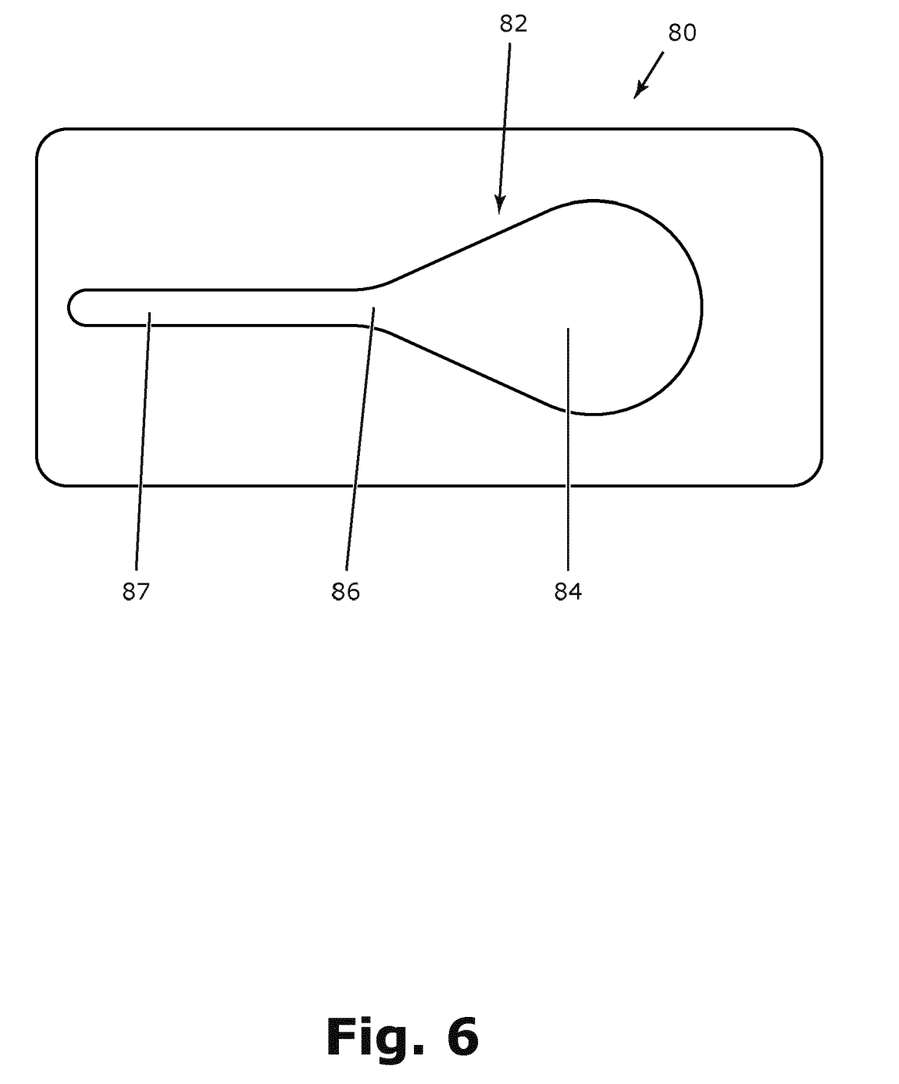
FIG. 6 shows a locking slider of FIG. 1.

FIG. 6 shows the locking slider 80 in more detail. Said locking slider 80 has a passage opening 82 having a first area 84 through which the calibration hose 1 can be guided without being clamped. The passage opening 82 has a tapered area 86 on a first side which opens out into a passage channel 87. If the calibration hose 1 is pressed in the direction of the first area 86 into the passage channel 87, the calibration hose 1 is compressed and at least one channel 6 or even all channels 6, 8 of the calibration hose are closed.

The invention claimed is:

1. A gastric calibration hose, comprising:
an elongated flexible hollow body having an outer wall, a first hose end, and a second hose end;
wherein the elongated flexible hollow body has at least two channels, each channel extending in a longitudinal direction of the hollow body, the first channel comprising at least one opening in the area of the second hose end and the second channel being closed at the second hose end;
wherein at least one illuminant is arranged in the area of the second hose end in the second channel; and
wherein a terminating element terminating the hollow body is arranged at the second hose end, the terminating element including an opening in fluid communication with the first channel and with an outside of the gastric calibration hose.

2. The gastric calibration hose according to claim 1, wherein a power supply device is provided for the at least one illuminant, the power supply device being connected to the illuminant by at least one power cable, the power supply device being arranged outside the hollow body.

3. The gastric calibration hose according to claim 2, wherein the power supply device is provided within a housing that is disposed outside the hollow body, the housing being mounted on the outer wall of the hollow body.

4. The gastric calibration hose according to claim 2, wherein the second channel is at least partially delimited by the outer wall of the hollow body, said outer wall delimiting the second channel having an exit opening in the area of the first hose end, through which exit opening the at least one power cable is guided which connects the power supply device and the illuminant.

5. The gastric calibration hose according to claim 2, wherein the power supply device is adapted to be switched on and off.

6. The gastric calibration hose according to claim 2, wherein the power supply device comprises at least one battery or rechargeable battery.

7. The gastric calibration hose according to claim 1, wherein the power supply device is provided within a housing that is disposed outside the hollow body, the housing being releasably attached to the outer wall of the hollow body.

8. The gastric calibration hose according to claim 1, wherein the at least one illuminant is a first LED band having an upper side and a lower side, several adjacently arranged LEDs being arranged on the upper side.

9. The gastric calibration hose according to claim 8, wherein a second illuminant is provided which is a second LED band having an upper side and a lower side, several adjacently arranged LEDs being arranged on the upper side, and the lower side of the second LED bank being connected to the lower side of the first LED band such that the LEDs arranged on the respective upper sides illuminate in opposite directions.

10. The gastric calibration hose according to claim 9, wherein one or both of the first and the second LED band are between 2 and 30 cm long.

11. The gastric calibration hose according to claim 8, wherein several adjacently arranged LEDs are also arranged on the lower side of the first LED band.

12. The gastric calibration hose according to claim 1, wherein the terminating element is formed to be blunt.

13. The gastric calibration hose according to claim 1, wherein the terminating element comprises a material that includes radiopaque material, preferably barium sulfate.

14. The gastric calibration hose according to claim 1, wherein one or both of the outer wall and the delimiting wall between the at least two channels is made of a material including silicone.

\* \* \* \* \*